(12) United States Patent
Gayon et al.

(10) Patent No.: US 11,166,091 B2
(45) Date of Patent: Nov. 2, 2021

(54) SPEAKER DEVICE FOR A MOTOR VEHICLE SEAT

(71) Applicant: FAURECIA Sièges d'Automobile, Nanterre (FR)

(72) Inventors: David Gayon, Etrechy (FR); Laurent Tapin, Lure (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 16/781,287

(22) Filed: Feb. 4, 2020

(65) Prior Publication Data
US 2020/0260167 A1   Aug. 13, 2020

(30) Foreign Application Priority Data
Feb. 7, 2019  (FR) ...................................... 19 01233

(51) Int. Cl.
| | | |
|---|---|---|
| H04R 1/02 | (2006.01) | |
| B60N 2/879 | (2018.01) | |
| H04R 1/08 | (2006.01) | |
| H04R 1/40 | (2006.01) | |
| H04R 3/12 | (2006.01) | |
| H04R 29/00 | (2006.01) | |

(52) U.S. Cl.
CPC ............ *H04R 1/025* (2013.01); *B60N 2/879* (2018.02); *H04R 1/026* (2013.01); *H04R 1/08* (2013.01); *H04R 1/403* (2013.01); *H04R 3/12* (2013.01); *H04R 29/002* (2013.01); *H04R 2420/07* (2013.01); *H04R 2499/13* (2013.01)

(58) Field of Classification Search
CPC ...... H04R 2499/13; H04R 1/025; H04R 1/02; B60R 11/0217; B60R 2011/0017
USPC ............................ 381/86, 332, 333, 91, 94.7
See application file for complete search history.

(56) References Cited

U.S. PATENT DOCUMENTS

| | | | |
|---|---|---|---|
| 6,356,645 B1 | 3/2002 | Trenkle | |
| 6,360,083 B1 * | 3/2002 | Fan ..................... | B60R 11/0217 455/575.1 |
| 9,596,544 B1 * | 3/2017 | Brotherton ............. | H04R 19/02 |
| 10,477,303 B1 * | 11/2019 | Kapolnek .............. | H04R 1/403 |
| 2012/0125959 A1 | 5/2012 | Kucera | |

FOREIGN PATENT DOCUMENTS

| | | |
|---|---|---|
| EP | 0917988 A1 | 5/1999 |
| EP | 2910429 A1 | 8/2015 |
| KR | 20010099425 A | 11/2001 |
| KR | 20160104310 | 9/2016 |

OTHER PUBLICATIONS

French Preliminary Search Report for FR1901233, dated Nov. 13, 2019, 14 pages.

* cited by examiner

*Primary Examiner* — Alexander Krzystan
(74) *Attorney, Agent, or Firm* — Barnes & Thornburg LLP

(57) ABSTRACT

A speaker device for a vehicle seat comprises at least one loudspeaker, a wireless communication module operatively connected to the at least one loudspeaker, and an attachment support for fixing the speaker device to the vehicle seat.

20 Claims, 3 Drawing Sheets

SPEAKER DEVICE FOR A MOTOR VEHICLE SEAT

PRIORITY CLAIM

Figure 1:
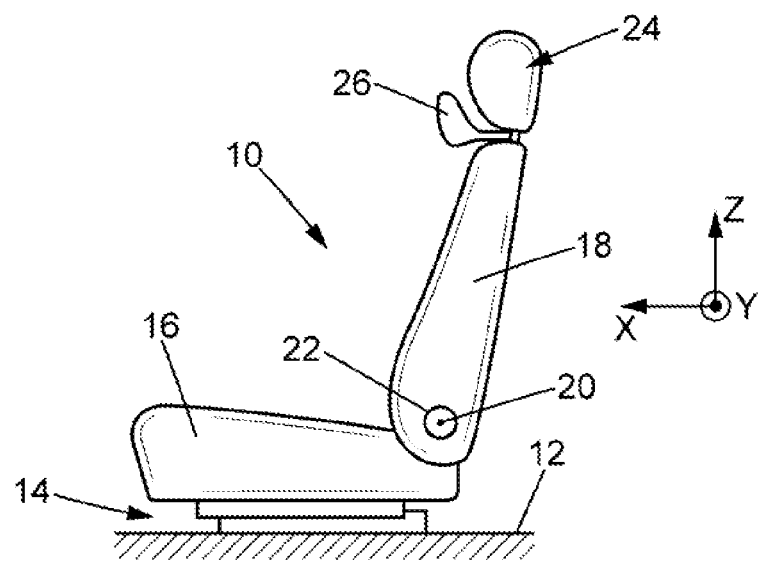

This application claims priority to French Application No. FR 19 01233, filed Feb. 7, 2019, which is expressly incorporated by reference herein.

BACKGROUND

The present disclosure relates to a speaker device for a vehicle seat, particularly for a vehicle seat. More particularly for a motor vehicle seat comprising such a speaker device.

SUMMARY

According to the present disclosure, a speaker device for a vehicle seat is proposed, particularly for a motor vehicle seat, comprising:
 at least one loudspeaker;
 a wireless communication module operatively connected to the at least one loudspeaker; and
 an attachment support for fixing the speaker device to the vehicle seat.

In illustrative embodiments, the speaker device may be attached to the motor vehicle and used by a single user without disturbing the other occupants of the motor vehicle.

In illustrative embodiments, the speaker device may include one or more of the following features, alone or in combination:
 the speaker device further comprises at least one attachment device, intended to be fixed on an attachment rod for fixing a headrest on a vehicle seat backrest, the attachment device forming a housing for receiving at least a portion of the attachment support;
 the at least one attachment device comprises a means for clamping the attachment support in the receiving housing;
 the attachment device comprises two eccentrics each intended to be mounted on an attachment rod for fixing a headrest on a backrest of the vehicle seat, the eccentrics being shaped to be pivoted when the attachment support is inserted between the two eccentrics, to a position where the attachment support is clamped between the two eccentrics;
 each eccentric is resiliently biased to rotate in a direction opposite to the direction in which the eccentric in question is pivoted during insertion of the attachment support between the two eccentrics;
 the attachment device further comprises two pairs of rollers, the two pairs of rollers defining said housing for receiving the attachment support, each eccentric extending at least partially into a respective housing, where appropriate;
 the speaker device comprises at least two loudspeakers;
 the speaker device comprises a U-shaped active part connected to the attachment support, at least one loudspeaker being arranged in each side arm of the active part, preferably in the vicinity of the free end of the side arm;
 the speaker device comprises at least one microphone connected to an electronic control unit, the electronic control unit being adapted to control the at least one loudspeaker so as to compensate for noise captured by said at least one microphone;
 the attachment support is removable, the attachment support being for example fixed on the active part by snap-fitting or clamping;
 the attachment support comprises at least one through-hole, preferably two or three through-holes, each adapted to be traversed by an attachment rod for fixing a headrest on a vehicle seat backrest;
 the attachment support has a U- or L-shaped cross-section;
 the attachment support and the active part can pivot relative to one another, about a transverse axis;
 the attachment support comprises a battery for the loudspeaker(s) and/or an electrical outlet for powering the loudspeaker(s) and/or for recharging the battery, the electrical outlet preferably being of the USB type; and
 the speaker device comprises controls for an electronic device to be connected to the speaker device by means of the wireless communication module.

In illustrative embodiments, a vehicle seat is provided comprising a seating portion, a backrest, a headrest fixed to the backrest by means of at least one attachment rod, and a speaker device as described above in any of its combinations.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
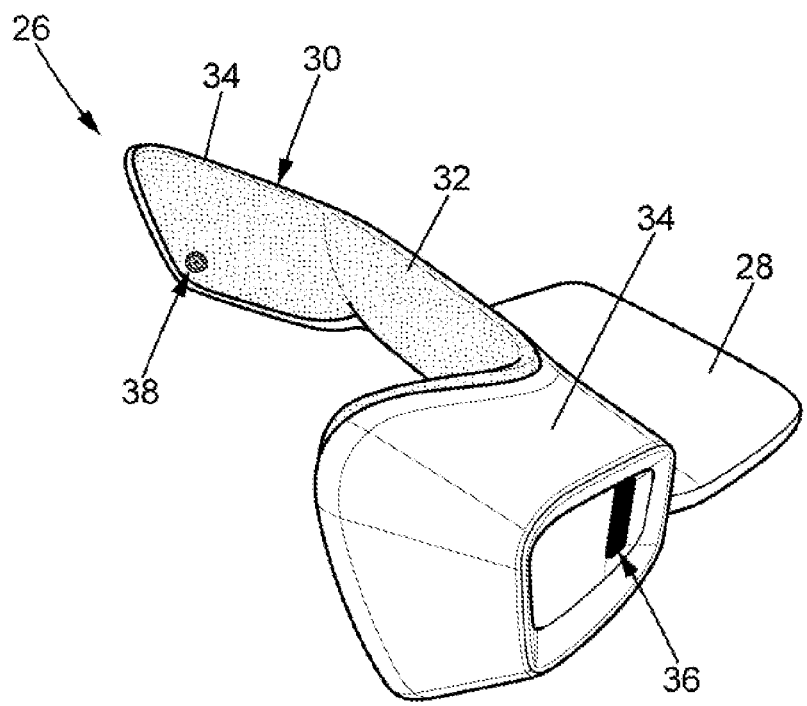
Figure 3:
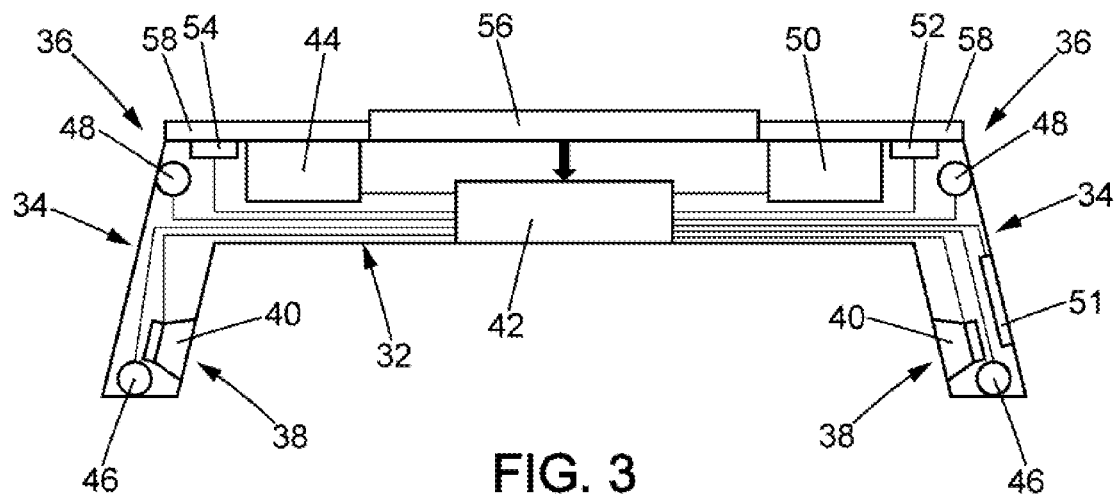
Figure 4:
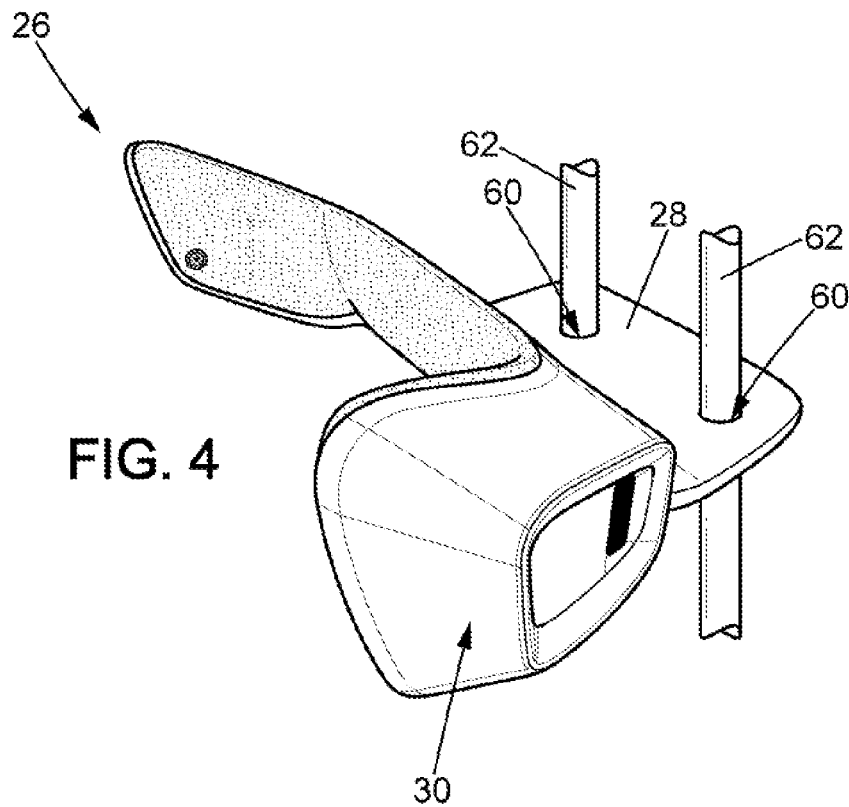
Figure 5:
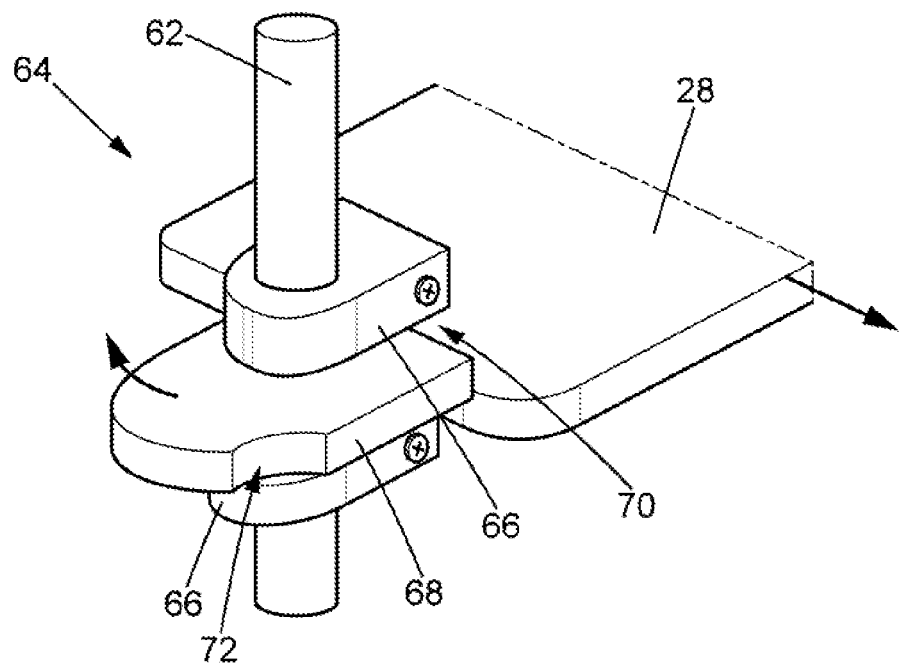
Figure 6:
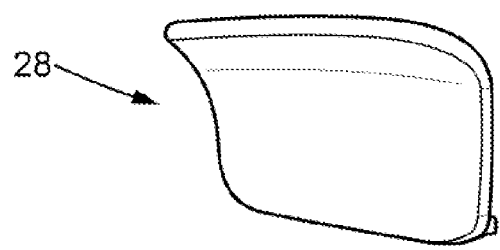

The detailed description particularly refers to the accompanying figures in which:
 FIG. 1 schematically represents a motor vehicle seat provided with a speaker device;
 FIG. 2 schematically represents a perspective view of an exemplary speaker device which can equip the vehicle seat of FIG. 1;
 FIG. 3 schematically illustrates an exemplary active part of the speaker device of FIG. 2;
 FIG. 4 illustrates a first example of an attachment means for fixing the speaker device of FIG. 2 on a vehicle seat;
 FIG. 5 illustrates a second example of an attachment means for fixing the speaker device of FIG. 2 to a vehicle seat; and
 FIG. 6 schematically illustrates a variant of the attachment support of the speaker device of FIG. 2.

DETAILED DESCRIPTION

In the different figures, the same references designate identical or similar elements. For brevity, only the elements which are useful to understanding the described embodiments are shown in the figures and are described in detail below.

In the description which follows, when reference is made to absolute position qualifiers such as the terms "front", "rear", "top", "bottom", "left", "right", etc., or relative qualifiers such as the terms "above", "below", "upper", "lower", etc., or to orientational qualifiers such as "horizontal", "vertical", etc., unless otherwise specified these refer to the orientation of the figures or of a seat in its normal position of use.

FIG. 1 schematically represents a motor vehicle seat 10 fixed to the floor of the motor vehicle 12 by means of a rail mechanism 14.

The seat 10 comprises a seating portion 16 on which a backrest 18 is mounted, generally pivoting about an axis 20 by a hinge mechanism 22.

As illustrated, the seat 10 further comprises a headrest 24 slidably mounted on the backrest 18, to enable adjusting its height in a substantially vertical direction Z.

Between the headrest 24 and the backrest 18 is fixed a speaker device 26 for a vehicle seat, more clearly visible in FIG. 2. As can be seen in this FIG. 2, the speaker device 26 essentially comprises an attachment support 28 and an active part 30 detachably fixed to the support 28. The active part 30 here has a U shape, its base 32 connected to the support 28. Two arms 34 extend from the base 32, here symmetrically, to form the U shape of the active part 30. A first opening 36 is created substantially at the foot of each arm 34. On the opposite face of each arm 34 and at the opposite end from the foot, a second opening 38 is provided in the example illustrated. The inner face of the active part 30 may be covered with a material pleasant to the touch, in particular flocked plastic. Indeed, this inner face of the active part 30, in particular of the base 32 of the active part 30, can be used to support the neck of an occupant of the seat 10, using the speaker device 26.

An example of the interior of the active part 30 is illustrated in FIG. 3. As can be seen in this FIG. 3, the active part 30 comprises a plurality of loudspeakers 40. In the current case, two loudspeakers 40 are provided, each arranged in an arm 34 of the U-shaped active part 30. The loudspeakers are thus arranged so as to emit sound towards the ears of the user of the speaker device 26. It is thus possible to make use of the speaker device 26 practically without emitting sound that is bothersome or even audible to any other occupants of the motor vehicle who are not users of the speaker device 26.

The loudspeakers 40 are operatively connected to an electronic control unit 42. This electronic control unit 42 is connected in particular to a wireless communication module 44. Thus, the electronic control unit 42 can control the emission by the loudspeakers 40 of signals received wirelessly from any suitable electronic device, in particular a mobile telephone or a tablet. The wireless communication module 44 is adapted to receive signals from an electronic device, in particular by Wi-Fi, Bluetooth, infrared, and/or NFC ("Near Field Communication") or any other suitable protocol.

The active part 30 illustrated in FIG. 3 also comprises two first microphones 46. Advantageously, the two first microphones 46 are arranged in the vicinity of the free end of the arms 34, preferably facing the openings 38 located there. These first microphones 46 are operatively connected to the electronic control unit 42 so that signals captured by the first microphones 46 can be transmitted to a remote electronic device, for example a mobile phone or a tablet. In this case, the speaker device 26 may be implemented as a hands-free device, making it possible to hold a conversation with a caller while having both hands free for driving the vehicle.

The active part 30 illustrated in FIG. 3 also comprises two second microphones 48. These second microphones 48 are for example arranged facing the openings 36 at the foot of the side arms 34. These second microphones 48 are operatively connected to the electronic control unit 42. The second microphones 48 make it possible to capture ambient noise around the speaker device 26. The electronic control unit 42 can then control the loudspeakers 40 so that their emitted sounds reduce or even cancel out the surrounding noise for the user of the speaker device 26, whose head is located between the two loudspeakers 40. Part of the signal emitted by the loudspeakers 40 can thus substantially correspond to the noise captured by the second microphones 48, but in phase opposition to this captured noise. The second microphones 48 thus allow the speaker device to provide a noise reduction function for the user which may be referred to as noise cancellation. In a first variant, the electronic unit can command substantially the same noise compensation for each loudspeaker 40. Alternatively, only the noise captured by a second microphone 48 on one side of the active part 30 is considered for controlling the loudspeaker 40 arranged on that same side. In this case, the electronic control unit 42 can control different noise compensation for each of the two speakers 46.

The active part 30 may also include a battery 50, for example, of the nickel-lithium type. The active part 30 may also include a power outlet 52, for example for recharging the battery 50 or for enabling the operation of the active part 30 without consuming energy stored in the battery 50. Also, according to the variant illustrated in FIG. 3, the active part 30 may include one or more ports 54 for transferring data and/or for electrical recharging. The port or ports may in particular be a USB port or any other type of port accessible to those skilled in the art. Such a port makes it possible to operatively connect an electronic device to the speaker device 26 in a wired manner, to transfer data and/or recharge the battery 50 and/or supply electricity to the speaker device 26.

The active part 30 illustrated in FIG. 3 also includes a display and/or one or more indicator lights and/or one or more controls 51, which are operatively connected to the electronic control unit 42. In the example illustrated, these elements are located on one of the side arms 34 of the active part 30, where they are easily accessible to a user. The indicator lights may in particular make it possible to verify the charging of the battery and/or the connection between the speaker device 26 and a remote electronic device. For example, this or these indicator lights may take the form of one or more light-emitting diodes which emit a color according to the charging or whether or not the speaker device 26 is actually connected with an electronic device. A display can make it easier to control the speaker device 26 and/or an electronic device connected to the speaker device 26. Lastly, the controls may take the form of one or more buttons for controlling one or more functions of the speaker device 26 and/or of the electronic device connected to the speaker device 26 via the wireless communication module 44. These buttons may in particular allow answering a call received on a telephone connected to the speaker device 26, adjusting the volume of the loudspeakers 40 or even muting the sound from these loudspeakers 40, or switching from one song to another when an electronic device comprising music files is connected to the speaker device 26.

The active part 30 illustrated in FIG. 3 also includes a bus 56 enabling an electrical connection with the support 28. The bus 56 may also enable, alone or in addition with other means, the mechanical connection between the active part 30 and the support 28. The bus 56 is particularly useful in cases where the support 28 is provided with a battery and/or at least one wired data transfer port, in particular a USB port and/or an electrical outlet for the speaker system. Even in this case, it is advantageous for the active part 30 to be provided with a battery and/or at least one wired data transfer port and/or a power outlet, in order to enable using the active part 30 independently of the support 28. Thus, one can imagine leaving the support 28 in the motor vehicle in which the speaker device 26 is intended to be used, but removing the active part 30 in order to use it outside the motor vehicle, in a manner substantially analogous to a hands-free telephone kit and/or a connected speaker.

The support 28 is, for example, fixed to the active part 30 by snap-fitting or clamping complementary parts. The attachment between the support 28 and the active part 30 enables the active part 30 to pivot relative to the support 28, about an axis of transverse direction. This makes it possible to adjust the position of the active part, for example according to the size of the user, so that the loudspeakers 40 are oriented towards the ears of the user as much as possible. To achieve this, here the active part 30 comprises two housings 58 for receiving a shaft integral with the support 28, thus allowing the active part 30 to pivot relative to the support 28, around these shafts.

Different variants of the support 28 of the speaker device 26 and modes of fixing these supports 28 to a seat 10 will now be described in more detail.

First of all, as illustrated in FIG. 4, the support 28 may comprise one or more through-holes 60, for example one, two, or three through-holes 60, to allow fixing the support 28 on the attachment rods 62 for fixing the headrest 24 to the backrest 18 of the seat 10, this or these rods 62 being received in the through-holes 60. The support 28 is intended to remain in position in the motor vehicle.

As illustrated in FIG. 5, the support 28 may also be devoid of any through-holes 60 and/or may be fixed to a vehicle seat 10 in a different manner. FIG. 5 illustrates an example of such other means of fixing the support 28 on the seat 10. To do this, an attachment device 64 is provided, which is mounted on each of the rods 62 of the headrest 24 (in FIG. 5, only half of the attachment device 64 is illustrated). The attachment device 64 comprises, on each attachment rod 62 for fixing the headrest, two fixed rollers 66, separated by a distance substantially equal to the thickness of the support 28 in order to form a housing 70 (or groove) for receiving at least part of the support 28, and an eccentric 68 mounted so as to be resiliently biased to rotate, such that the insertion of the support 28 between the rollers 66 causes rotation of the two eccentrics 68, against the resilient biasing, until the support 28 is clamped between the two eccentrics 68. Such an attachment device 64 enables a particularly fast and effective attachment. In effect, it is sufficient to insert then push the support 28 between the rollers 66 to attach the speaker device 26. In addition, the cooperation of the rollers 66 defining the housing 70 and of the eccentrics 68 ensures an effective attachment of the speaker device 26.

In the example illustrated in FIG. 5, to facilitate manipulation of the eccentrics 68, in particular to facilitate the removal of the support 28 from the housing 70, each eccentric 68 is provided with a gripping part 72. In the example illustrated in FIG. 5, this gripping part 72 takes the form of a concave recess, for example in a convex portion of the eccentric 68.

FIG. 6 illustrates another variant of the shape of the support 28. Indeed, in the examples already described the support 28 is substantially planar, or even has a slightly curved, comma-like shape. In contrast, in FIG. 6 the support 28 has an essentially Z-shaped cross-section. This allows the support 28 to extend under a headrest having an L-shaped cross-section. Alternatively, the support 28 may also have a U-shaped cross-section, enabling it to extend under the headrest having an L-shaped cross-section and to "climb back up" the visible face of this headrest.

Motor vehicles may be equipped with a Hi-Fi device having loudspeakers arranged in the passenger compartment of the vehicle.

An electronic device, in particular a mobile phone, may be connected to the vehicle's Hi-Fi device so that the speakers in the passenger compartment of the vehicle are used to emit the sound produced by the electronic device. This makes it possible to listen to music stored on or captured by the electronic device. It is thus also possible to make a telephone call, the speakers in the passenger compartment of the vehicle emitting the sounds produced by the person speaking.

However, in all these cases, the sound is emitted throughout the vehicle. This sound may be bothersome for some of the vehicle passengers, particularly those located close to a loudspeaker of the Hi-Fi system of the vehicle.

The invention claimed is:

1. A speaker device for a vehicle seat comprising:
   at least two loudspeakers;
   a wireless communication module operatively connected to the at least one loudspeaker;
   an attachment support for fixing the speaker device to the vehicle seat,
   at least one attachment device fixed on an attachment rod for fixing a headrest on a backrest of the vehicle seat, the attachment device forming a housing for receiving at least a portion of the attachment support, and
   a U-shaped active part connected to the attachment support, at least one loudspeaker being arranged in each side arm of the U-shaped active part, the U-shaped active part being removable from the attachment support.

2. A speaker device for a vehicle seat comprising:
   at least one loudspeaker;
   a wireless communication module operatively connected to the at least one loudspeaker;
   an attachment support for fixing the speaker device to the vehicle seat, and
   two eccentrics each intended to be mounted on an attachment rod for fixing a headrest on a backrest of the vehicle seat, the eccentrics being shaped to be pivoted when the attachment support is inserted between the two eccentrics, to a position where the attachment support is clamped between the two eccentrics.

3. A speaker device for a vehicle seat comprising:
   at least one loudspeaker;
   a wireless communication module operatively connected to the at least one loudspeaker;
   an attachment support for fixing the speaker device to the vehicle seat, and
   at least one microphone connected to an electronic control unit, the electronic control unit being adapted to control the at least one loudspeaker so as to compensate for noise captured by said at least one microphone.

4. The speaker device of claim 3, further comprising at least one attachment device, intended to be fixed on an attachment rod for fixing a headrest on a backrest of the vehicle seat, the attachment device forming a housing for receiving at least a portion of the attachment support.

5. The speaker device of claim 4, wherein the at least one attachment device comprises means for clamping the attachment support in the receiving housing.

6. The speaker device of claim 2, wherein each eccentric is resiliently biased to rotate in a direction opposite to the direction in which the eccentric in question is pivoted during insertion of the attachment support between the two eccentrics.

7. The speaker device of claim 1, wherein the attachment device further comprises two pairs of rollers, the two pairs of rollers defining said housing for receiving the attachment support.

8. The speaker device of claim 6, wherein the attachment device further comprises two pair of rollers, the two pairs of rollers defining said housing for receiving the attachment support, each eccentric extending at least partially into a respective housing.

9. The speaker device of claim 2, comprising at least two loudspeakers.

10. The speaker device of claim 9, further comprising a U-shaped active part connected to the attachment support, at least one loudspeaker being arranged in each side arm of the active part.

11. The speaker device of claim 10, wherein said at least one loudspeaker is arranged in the vicinity of the free end of the side arm.

12. The speaker device of claim 2, wherein the attachment support is removable.

13. The speaker device of claim 10, wherein the attachment support is removable and wherein the attachment support is fixed on the active part by snap-fitting or clamping.

14. The speaker device of claim 3, wherein the attachment support comprises at least one through-hole, each adapted to be traversed by an attachment rod for fixing a headrest on a backrest of the vehicle seat.

15. The speaker device of claim 2, wherein the attachment support has a U- or L-shaped cross-section.

16. The speaker device of claim 10, wherein the attachment support and the active part can pivot relative to one another, about a transverse axis.

17. The speaker device of claim 1, wherein the attachment support comprises at least one among:
 a battery for the at least one loudspeaker;
 an electrical outlet for powering at least one loudspeaker; and
 an electrical outlet for recharging the battery.

18. The speaker device of claim 1, further comprising controls for an electronic device to be connected to the speaker device by means of the wireless communication module.

19. A vehicle seat comprising
 a seating portion,
 a backrest,
 a headrest fixed to the backrest by means of at least one attachment rod, and
 a speaker device according to claim 1.

20. The speaker device of claim 1, further comprising at least one microphone connected to an electronic control unit, the electronic control unit being adapted to control the at least two loudspeakers so as to compensate for noise captured by said at least one microphone.

* * * * *